United States Patent [19]

Gross

[11] 4,426,099

[45] Jan. 17, 1984

[54] COLLAPSIBLE LUGGAGE CARRIER

[76] Inventor: Sol A. Gross, 3154 Grand Ave., Baldwin, Long Island, N.Y. 11510

[21] Appl. No.: 324,876

[22] Filed: Nov. 25, 1981

[51] Int. Cl.³ .............................................. B62B 1/04
[52] U.S. Cl. .................................. 280/655; 280/47.17; 280/47.27; 280/47.29
[58] Field of Search ............. 280/40, 652, 655, 47.29, 280/47.37 R, 87.01, 654, DIG. 3, 47.13 R, 47.17, 47.24, 47.27; 190/18 R, 18 A; 294/167, 169

[56] References Cited

U.S. PATENT DOCUMENTS

| 2,421,322 | 5/1947 | Frazin | 280/655 |
|---|---|---|---|
| 2,500,588 | 3/1950 | Vosseler et al. | 280/655 |
| 3,197,226 | 7/1965 | Erlinder | 280/646 |
| 3,580,600 | 5/1971 | Caplin | 280/655 |
| 4,037,858 | 7/1977 | Adams | 280/652 |
| 4,062,565 | 12/1977 | Holtz | 280/655 |
| 4,348,034 | 9/1982 | Welt | 280/655 |

FOREIGN PATENT DOCUMENTS 2272574  1/1976  France ............................... 280/652

*Primary Examiner*—Joseph F. Peters, Jr.
*Attorney, Agent, or Firm*—Robert H. Fischer

[57] ABSTRACT

A collapsible luggage carrier having a load support beam with a wheel assembly attached near each end of the support beam. A pair of folding spaced-apart support forks are pivotally mounted to the support beam. Also provided is a pair of folding frame struts, each comprised of an upper elongate member pivotally attached to a lower elongate member, the free ends of the upper elongate members terminating in handle portions juxtaposed or optionally fastened detachably together to define a complete handle, and the free ends of the lower elongate members spaced-apart and pivotally mounted to the load support beam.

11 Claims, 9 Drawing Figures

COLLAPSIBLE LUGGAGE CARRIER

BACKGROUND OF THE INVENTION

This invention relates to collapsible baggage or luggage carriers primarily intended for personal, non-commercial use.

Airline, bus and train passengers are well acquainted with having to walk long distances from a terminal entrance to their designated gate while burdened with heavy luggage. In order to make carrying and handling of luggage less burdensome, passengers often use apparatus that aids transport of luggage, such as rolling luggage carriers. But in order for the luggage carrier itself not to be a burden, the carrier preferably should fold into a compact shape so that it can be easily carried and stored when not in use. Additionally, the carrier should be light and simple to operate. Yet the carrier must also unfold into a strong structure that provides a stable base for luggage.

Present luggage carriers do not satisfy these design criteria. Typical of present carriers is that described in U.S. Pat. No. 4,062,565, variants of which are believed to be commercially offered. Such carriers generally have a rectangular frame and luggage support bed, both of which fold into a flat rectangular configuration having generous dimensions. Consequently, in transportation terminals one can observe that these folded carriers are often tied with elastic bungee cords to the outside of the traveler's suitcase when they are not in use. They are simply too big, even when folded, to comfortably fit within the traveler's suitcase. But even this large rectangular folded configuration necessitates a relatively narrow luggage support bed, so as not to increase the folded size even more. This results in a luggage support bed that is only minimally stable.

SUMMARY OF THE INVENTION

The collapsible luggage carrier of the present invention is believed to solve the problems inherent in the prior art. This is accomplished by departing from the concept of folding the carrier into a rectangular configuration. Instead, the carrier of the present invention folds into a compact linear configuration, as explained below.

The invention comprises a rigid load support beam with a wheel assembly attached proximate each end of the support beam. A pair of independently folding spaced-apart load support forks is pivotally mounted to the support beam, inward of and proximate to the wheel assemblies. Means are provided for locking each support fork in an unfolded position. Also provided is a pair of folding frame struts, each strut comprised of an upper elongate member pivotally attached to a lower elongate member, the free ends of the upper elongate members terminating in handle portions juxtaposed to define a complete handle. Optionally, means for detachably fastening the handle portions together can be used. The lower ends of the lower elongate members are spaced-apart and pivotally mounted to the load support beam proximate to the wheel assemblies. The upper and lower elongate members of each folding frame strut pivot approximately in the same plane as the upper and lower elongate members of the other folding frame strut. Means are provided for locking each folding frame strut in an unfolded position.

When unfolded, the luggage carrier of the present invention yields a relatively wide luggage support bed that accordingly provides a stable platform for luggage and baggage. The folding frame struts form a rigid carrier frame which cooperates with the luggage support bed to support and maintain luggage on the elements of the carrier when the carrier is being used.

Upon folding, the support forks nest adjacent to each other and against the load support beam. The following frame struts fold in a more complex configuration, with the upper and lower elongate members of each folding frame strut nesting adjacent to each other, the nested elongate members of each folding frame strut nesting in turn adjacent to the nested elongate members of the other folding frame strut, and both the folding frame struts nesting against the support beam with the handle portions overlaying the ends of the support beam.

When folded, the elements comprising the luggage carrier of this invention cooperate with each other in such a way as to result in an extremely compact configuration.

DESCRIPTION OF THE PREFERRED EMBODIMENTS

Figure 1A:
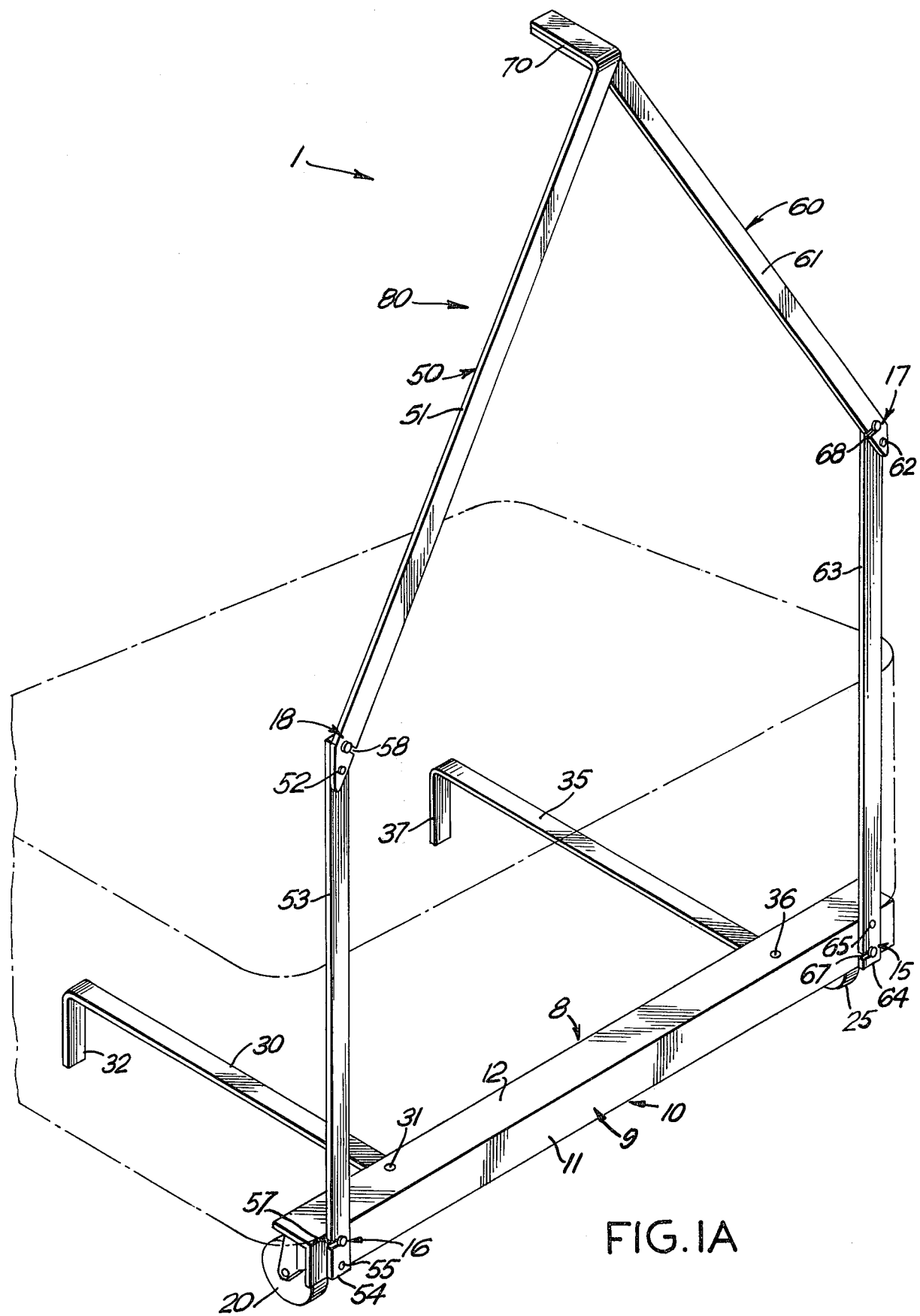
FIG. 1A is a perspective view of the luggage carrier of the present invention as unfolded. A suitcase (dotted) is shown loaded thereon.

Referring to the drawings in detail, wherein like reference characters designate corresponding parts throughout the several figures, and particularly referring to FIG. 1A, there is shown a rigid load support beam 10, which is the principal structural element of the luggage carrier of the present invention, generally designated 1. Load support beam 10 is a structural angle in section, thereby defining a rectangular and planar vertical surface 11 having a longer free edge 9 and a rectangular and planar horizontal surface 12 having a longer free edge 8. Two wheel assemblies 20 and 25 are attached to the underside of horizontal surface 12 proximate the ends of support beam 10.

Figure 2:
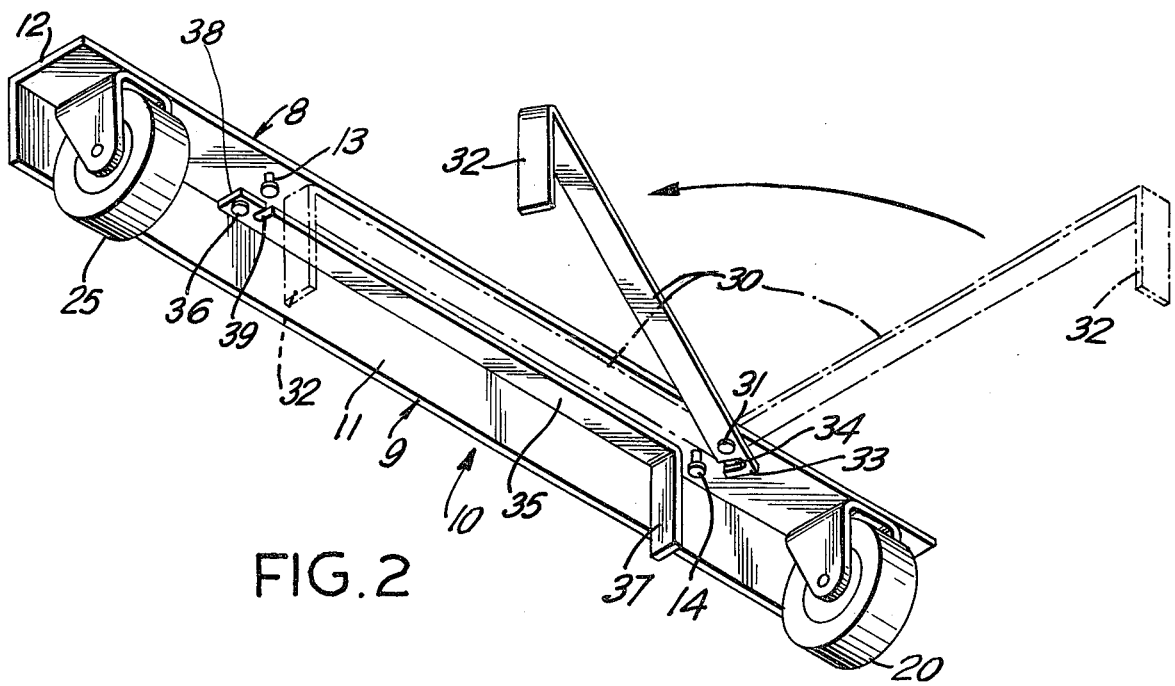
FIG. 2 is a perspective view of the luggage carrier, which shows the folding and nesting of the luggage support forks. The folding frame struts are eliminated from this view for simplicity.

A pair of folding load support forks 30 and 35 are employed to carry luggage. They are shown in FIG. 1A in their open, or unfolded position. Support forks 30 and 35 are spaced apart and pivotally mounted under horizontal surface 12 of support beam 10. Since support forks 30 and 35 fold inwardly towards each other, as shown in FIG. 2, the pivot points 31 and 36 around which they respectively pivot should be located inwardly of the wheel assemblies so that wheel assemblies 20 and 25 do not interfere with folding. At the same time, it is preferable that pivot points 31 and 36 be located proximate to the wheel assemblies in order to obtain as large a distance as possible between support forks 30 and 35 when they are unfolded. A large distance between support forks 30 and 35 provides a wide base for luggage placed on the forks, luggage thereby being less prone to fall off.

The free ends of load support forks 30 and 35 are downwardly bent respectively to define feet 32 and 37. These feet, in coooperation with wheel assemblies 20 and 25, allow the luggage carrier 1 to stand upright without aid from the user of the carrier.

FIG. 2 generally shows the folding of load support forks 30 and 35. When folded, the support forks nest adjacent to each other and against load support beam 10. In FIG. 2, support fork 35 is shown in a completely folded configuration, with support fork 30 shown in a partially folded configuration. So that the support forks can nest more compactly, it is preferable to stagger pivot points 31 and 36 about the centerline of horizontal surface 12 that is parallel to longer free edge 8. This centerline is hereinafter termed the "longitudinal centerline" of horizontal surface 12.

The staggered configuration of pivot points 31 and 36 is shown in FIGS. 1 and 2. Pivot point 31 is shown staggered towards free edge 8, while pivot point 36 is shown staggered away from free edge 8. By staggering the pivot points in such a manner, the load support forks 30 and 35 when folded nest against horizontal surface 12 parallel to the longitudinal centerline of horizontal surface 12.

Means are provided for locking support forks 30 and 35 in an unfolded position. Successful operation of the locking means used in the presently preferred embodiment requires that load support fork 35 be pivotally mounted at pivot point 36 proximate to its end 38, as shown in FIG. 2, and that load support fork 30 be pivotally mounted at pivot point 31 distally forward of its end 33, also as shown in FIG. 2.

The locking means for each support fork comprises a pin terminating in a flanged head and a slot in the load support fork adapted to engage the pin when the load support fork is in an open position. Referring to FIG. 2, pin 13, which terminates in a flanged head, is located on horizontal surface 12 forward of pivot point 36. Slot 39 in support fork 35 is located forward of pivot 36 and is adapted to engage pin 13 when support fork 35 is in an open position. Similarly, pin 14, which terminates in a flanged head, is located on horizontal surface 12 rearward of pivot point 31. Slot 34 in support fork 30 is located rearward of pivot 31 and is adapted to engage pin 14 when support fork 30 is in an open position. A frictional fit between each slot and each pin terminating in a flanged head holds each load support fork in an open position. Each slot extends into a fork no deeper than is necessary to allow each load support fork to completely open. This prevents each support fork from folding beyond its open position so as to interfere with operation of the wheel assemblies 20 and 25. Additionally, the flanged head of each pin allows each load support fork to better resist bending caused by the weight of luggage.

Figure 6:
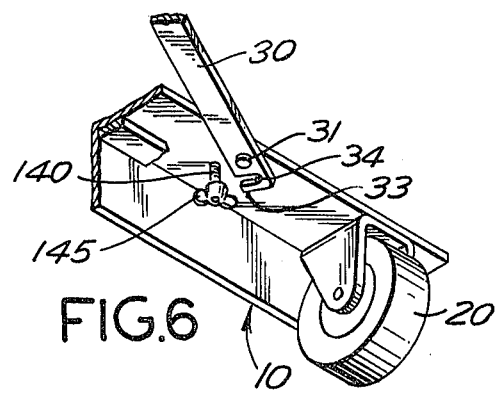
FIG. 6 is a perspective view of a portion of the luggage carrier which shows in detail an alternate means for locking the load support forks in an unfolded position.

An alternative locking means for each support fork comprises substitution of threaded studs for pins 13 and 14. This alternative locking means is shown in FIG. 6 for support fork 30. Referring to that Figure, a wing nut 145 is threaded onto a stud 140. The free end of stud 140 is adapted to prevent removal of wing nut 145, as for example, by scoring or otherwise damaging the threads proximate to the free end of stud 140. After opening load support fork 30, the user tightens wing nut 145 by hand, which tightly locks support fork 30 in its open position.

Referring again to FIG. 1A, a pair of folding frame struts 50 and 60 is shown in their unfolded, or open position. Together, folding frame struts 50 and 60 define luggage carrier frame 80. Folding frame struts 50 and 60 respectively are comprised of upper elongate members 51 and 61 pivotally attached at pivot points 52 and 62 to lower elongate members 53 and 63. Lower ends 54 and 64 of lower elongate members 53 and 63 are spaced-apart and pivotally mounted at pivot points 55 and 65 to vertical surface 11 of load support beam 10. The upper and lower elongate members of each folding frame strut pivot approximately in the same plane as the upper and lower elongate members of the other folding frame strut.

Figure 3:
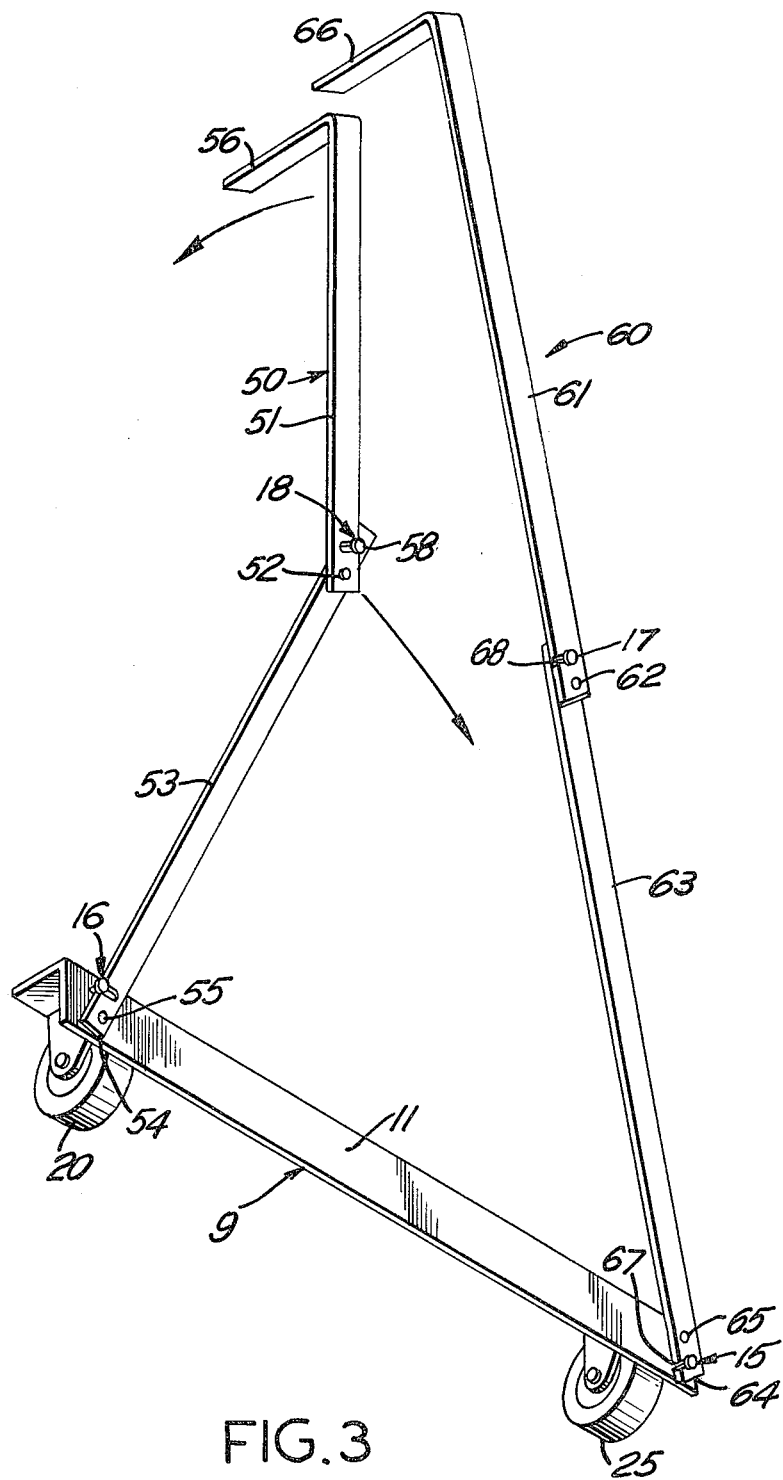
FIG. 3 is a perspective view of the luggage carrier which shows the folding frame struts at the start of their folding sequence. The luggage support forks are eliminated from this view for simplicity.

Referring to FIG. 3, it can be seen that the free ends of upper elongate members 51 and 61 respectively terminate in handle portions 56 and 66, which, as shown in FIG. 1A, are juxtaposed by the user to define a complete handle 70. Optionally, means for detachably fastening together handle portions 56 and 66 can be provided. Such means are preferred for making use of luggage carrier 1 easier.

Folding frame struts 50 and 60 are shown in FIG. 1A in their unfolded, or open positions. Lower elongate members 53 and 63 when unfolded are oriented perpendicular to load support beam 10 and parallel to each other. Upper elongate members 51 and 61 converge towards handle 70. This configuration provides a relatively wide luggage frame 80 that allows luggage carrier 1 to carry more than one suitcase or piece of luggage.

Figure 1B:
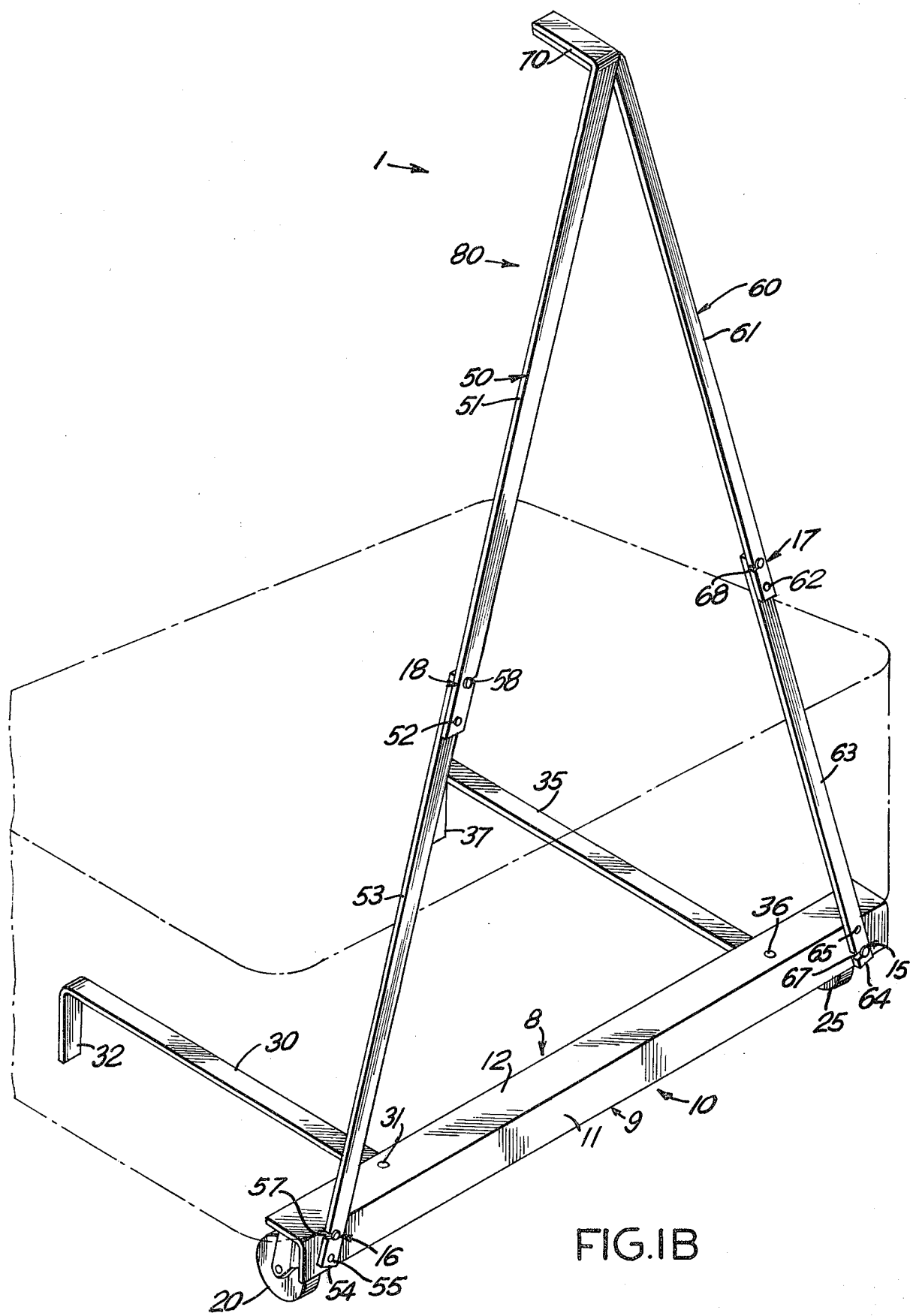
FIG. 1B is a perspective view of an alternative embodiment of the present invention as unfolded.

FIG. 1B depicts an alternative configuration for luggage frame 80. As shown, both lower elongate members 53 and 63 and upper elongate members 51 and 61 converge towards handle 70. The amount of convergence is such that lower elongate members 53 and 63 are colinear respectively with upper elongate members 51 and 61. This alternative configuration results in handle 70 being further from the ground than handle 70 in FIG. 1A. Such a result is advantageous for relatively small luggage carriers constructed in accordance with this disclosure. Such carriers are not intended to carry more than one large piece of luggage and thus do not require the configuration shown in FIG. 1A, yet for comfortable use do require approximately the same handle height. Hence the utility of the configuration shown in FIG. 1B.

Figure 4:
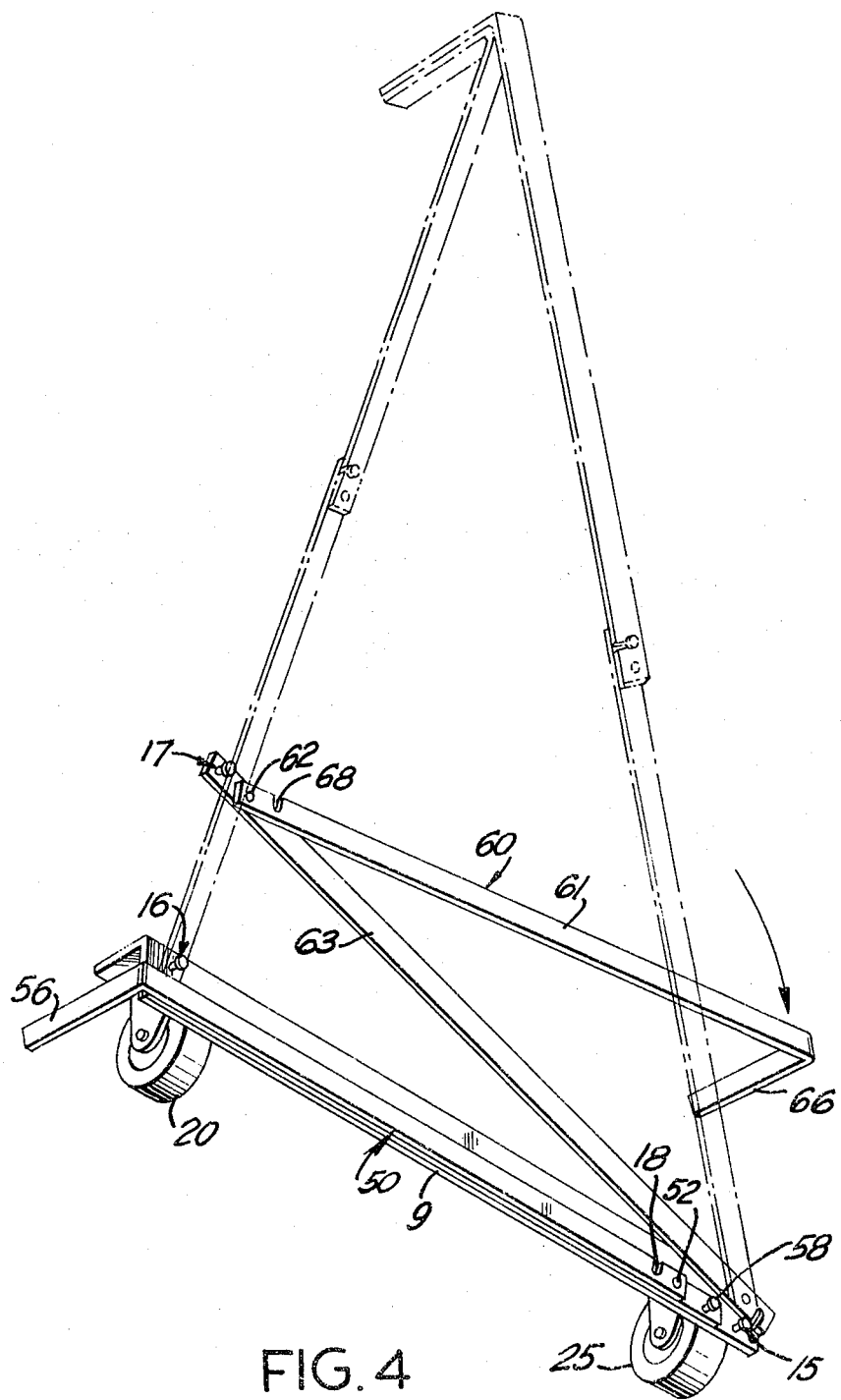
FIG. 4 is a perspective view of the luggage carrier which shows the folding frame struts near the end of their folding sequence. The luggage support forks are eliminated from this view for simplicity.

FIGS. 3 and 4 generally show how folding frame struts 50 and 60 fold. When completely folded, the upper and lower elongate members of each folding frame strut nest adjacent to each other, the nested elongate members of each folding frame strut nest adjacent to the nested elongate members of the other folding frame strut, and both folding frame struts nest against support beam 10, with handle portions 56 and 66 overlaying the ends of support beam 10. FIG. 3 shows folding frame strut 60 in its unfolded configuration, while folding frame strut 50 is starting to be folded. In FIG. 4, folding frame strut 50 is shown in a completely folded configuration, and folding frame strut 60 is shown in a partially folded configuration.

So that folding frame struts 50 and 60 can nest more compactly, it is preferable to stagger pivot points 55 and 65 about the centerline of vertical surface 11 that is parallel to longer free edge 9. This centerline can also be termed the "longitudinal centerline" of vertical surface 11.

The staggered configuration of pivot points 55 and 65 is shown in FIG. 1A. Pivot point 55 is shown staggered towards free edge 9, while pivot point 65 is shown staggered away from free edge 9. By staggering the pivot points in such a manner, folding frame struts 50 and 60 when folded nest against vertical surface 11 parallel to the longitudinal centerline of vertical surface 11.

Means are provided for locking folding frame struts 50 and 60 in an unfolded position. Such locking means can be located proximate to pivot points 55 and 65, or proximate to pivot points 52 and 62, or proximate to all four pivot points, depending upon the degree of stiffness desired for luggage frame 80. A particular locking means proximate to pivot points 55 and 65 is described below first, after which is described a particular locking means proximate to pivot points 52 and 62.

Successful operation of the locking means used in the presently preferred embodiment requires that lower elongate member 53 be pivotally mounted at pivot point 55 proximate to its lower end 54, as shown in FIG. 1A, and that lower elongate member 63 be pivotally mounted at pivot point 65 distally above its lower end 64, also as shown in FIG. 1A.

In a manner similar to the pin and slot locking means used for load support forks 30 and 35, the locking means for folding frame struts 50 and 60 each comprises a pin terminating in a flanged head and a slot in each lower elongate member adapted to engage the pin when the lower elongate member is in an open position.

Referring to FIG. 1A, pin 16, which terminates in a flanged head, is located on vertical surface 11 above pivot point 55. Slot 57 in lower elongate member 53 is located above pivot point 55 and is adapted to engage pin 16 when lower elongate member 53 is in an open position. Similarly, pin 15, which terminates in a flanged head, is located on vertical surface 11 below pivot point 65. Slot 67 in lower elongate member 63 is located below pivot point 65 and is adapted to engage pin 15 when elongate member 63 is in an open position.

The pin and slot locking means just described functions in a manner identical to the pin and slot locking means used for support forks 30 and 35.

Figure 7:
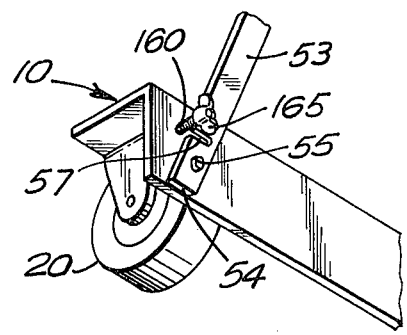
FIG. 7 is a perspective view of a portion of the luggage carrier which shows in detail an alternate means for locking the lower elongate members of the folding frame struts in an unfolded position.

The alternative locking means described for load support forks 30 and 35 is equally suitable for use with folding frame struts 50 and 60. Threaded studs are substituted for pins 15 and 16. This alternative locking means is shown in FIG. 7 for lower elongate member 53 of folding frame strut 50. A stud 60 has a wing nut 165 threaded onto it. Here again, the free end of stud 160 is adapted to prevent removal of wing nut 165.

Locking elongate members 53 and 63 in an open position and juxtaposing and holding, or, optionally, detachably fastening together handle portions 56 and 66 results in the folding frame struts 50 and 60 forming a rigid luggage carrier frame 80. In consequence, no locking means need be provided at pivot points 52 and 62. Alternatively, locking means can be provided at pivot points 52 and 62. If such is the case, no locking means need be provided at pivot points 55 and 65. However, locking means provided at points 55 and 65, as well as at points 52 and 62, yields an exceptionally stiff luggage carrier frame 80, useful where heavy items need often be carried.

Successful operation of locking means proximate to pivot points 52 and 62 requires that pivot points 52 and 62 be located distally below the upper ends of lower ellongate members 53 and 63, with upper elongate members 51 and 61 pivotally mounted at pivot points 52 and 62 proximate to their lower ends.

Figure 8:
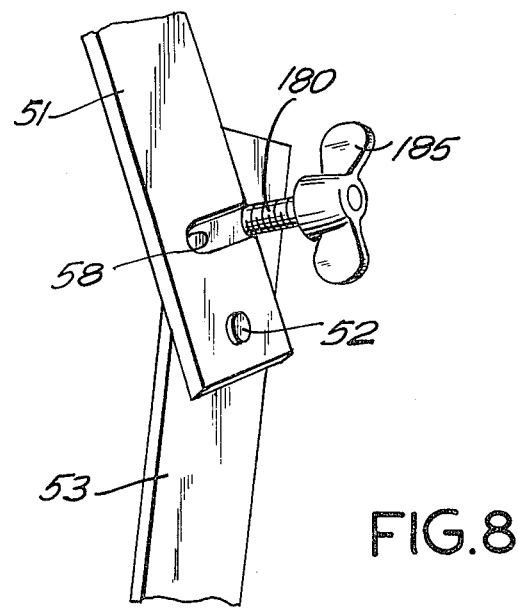
FIG. 8 is a perspective view of a portion of the luggage carrier which shows in detail an alternate means for locking the upper and lower elongate members together of each folding frame strut when they are in an unfolded position.

Referring to FIG. 1A, pin and slot locking means are again employed, with pins terminating in flanged heads 18 and 17 respectively mounted on lower elongate members 53 and 63 proximate to the upper ends of lower members 53 and 63 and distally above pivot points 52 and 62. Slots 58 and 68 are located in upper elongate members 51 and 61 respectively, distally above the lower ends of upper elongate members 51 and 61, and are adapted to engage respectively pins 18 and 17 when folding frame struts 50 and 60 are in an unfolded, or open position. FIG. 8 shows an alternative locking means proximate to pivot point 52. A wing nut 185 is threaded onto a stud 180 to lock lower elongate member 53 to upper elongate member 51 when folding frame strut 50 is an unfolded, or open position.

The embodiments shown in FIGS. 1A and 1B show pin and slot locking means at all points 55, 65, 52 and 62. Alternatively, substitution of a threaded stud and wing nut for any or all of the pins, as is shown in FIGS. 6 through 8, even further increases the stiffness of luggage frame 80.

Figure 5:
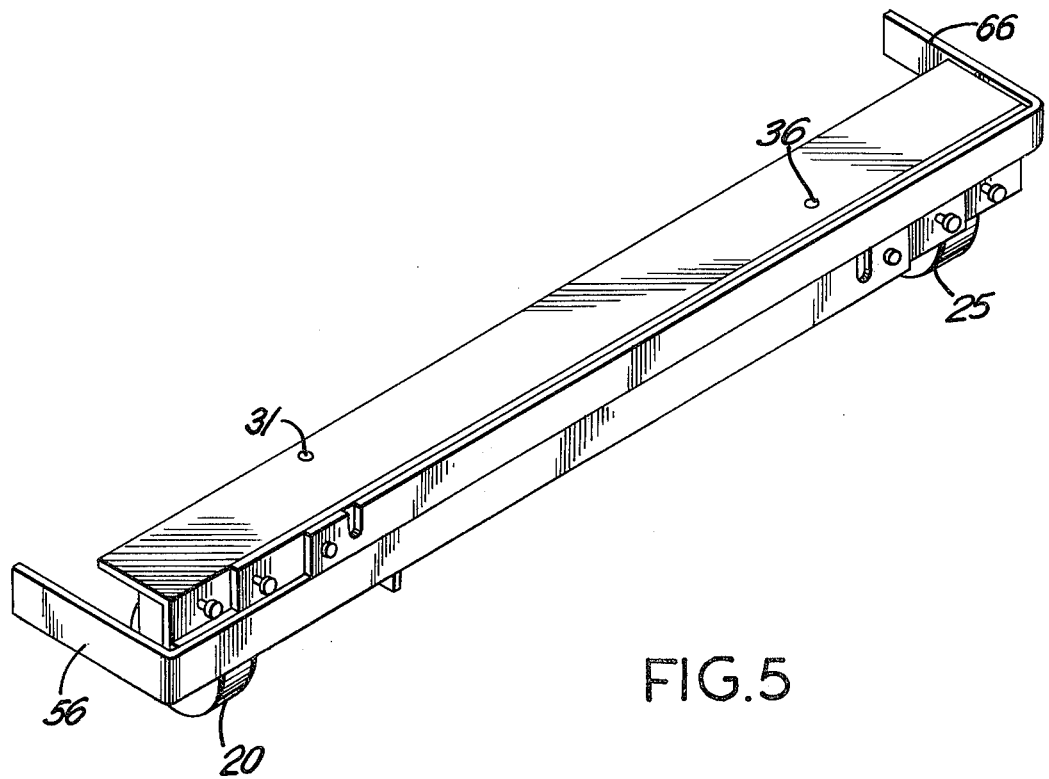
FIG. 5 is a perspective view showing the luggage carrier in its completely folded configuration.

FIG. 5 shows the extremely compact configuration that this luggage carrier has when folded. The support forks and frame struts compactly nest into the principal geometric surfaces that define load support beam 10. Potentially obtrusive items, specifically handle portions 56 and 66 and feet 32 and 37, fold in such a way that they are partially hidden, or masked, by portions of load support beam 10. Feet 32 and 37 are in major part masked by vertical surface 11. Handle portions 56 and 66, by overlaying the ends of support beam 10, are in major part masked by wheel assemblies 20 and 25 and horizontal surface 12. Hence, as can be seen in FIG. 5, only small segments of the handle portions and feet break the generally planar, rectilinear lines of luggage carrier 1 when folded. In general, the elements of this luggage carrier cooperate with each other to minimize the folded carrier's size.

Referring to the drawings, elongate members 51, 53, 61 and 63 are shown as being generally thin members in cross-section. It has been found that frame struts 50 and 60, when comprised of members 51, 53, 61 and 63 having such a cross-section, bend only a small amount from the flexural loads that result from carrying moderate amounts of luggage. However, in order to carry exceptionally heavy luggage or loads, bending of frame struts 50 and 60 may be decreased even further by increasing the moments of inertia of elongate members 51, 53, 61 and 63. For example, this can be accomplished by adding stiffening ribs (not shown) to each of the inner edges of elongate members 51, 53, 61 and 63. When such ribs are added along the inner edges, frame struts 50 and 60 can still be folded as described above, with only a minimal increase in the size of luggage carrier 1 when completely folded. Other cross-sectional shapes of frame struts 50 and 60 will be apparent to those skilled in the art, which can be adopted without departing from the spirit of this invention.

Comparison of the present invention with a prior luggage carrier illustrates the advantages of the present invention. A carrier having the general configuration of that shown in U.S. Pat. No. 4,062,565 was measured. When unfolded, it had, exclusive of wheels, an overall height of about 34.5 inches, or 87.6 cm; an overall width and luggage bed width of about 12.5 inches, or 31.75 cm; and a luggage bed length of about 10.75 inches, or 27.3 cm. This carrier folded into a generally flat rectangular configuration 12.5 inches, or 31.775 cm, wide, 22 inches, or 55.9 cm, long, and about 2 inches, or 5.1 cm, thick. The projected area of this carrier when folded was about 275.0 square inches, or about 1,774.2 square centimeters.

In contrast, an embodiment of the present invention according to FIG. 1B, when unfolded, had an overall height of about 41.5 inches, or 105.4 cm; an overall width of about 24 inches, or 61.0 cm; a luggage bed width of about 16 inches, or 40.6 cm; and a luggage bed length of about 15 inches, or 38.1 cm. This embodiment, including wheels, folded into a compact linear configuration having an overall length of about 24.5 inches, or 62.2 cm; and an overall thickness and width of about 2.75 inches, or 7.0 cm. The projected area of this present embodiment as 67.4 square inches, or 509.7 square centimeters. This represents a projected area about 75% smaller than the prior art carrier. This figure becomes even more dramatic when it is realized that the overall dimensions of the present carrier when unfolded are significantly larger than the prior art carrier.

Put another way, the present invention allows a luggage carrier larger than prior art carriers to be folded into a configuration significantly smaller than prior art carriers.

A present embodiment of luggage carrier 1 was fabricated from commercially available aluminum sections. Pivot points and pins with flanged heads were made of rivets. Other materials apparent to those skilled in the art are equally suitable for fabrication.

I claim:

1. A collapsible luggage carrier that folds into a compact linear configuration, said luggage carrier comprising:
   (a) a rigid load support beam;
   (b) a wheel assembly attached proximate each end of the support beam;
   (c) a pair of independently folding spaced-apart load support forks, pivotally mounted to the support beam inward of and proximate to the wheel assemblies, the support forks when folded nesting adjacent to each other and against the support beam;
   (d) means for locking each support fork in an unfolded position;
   (e) a pair of independently folding frame struts, each comprised of an upper elongate member pivotally attached to a lower elongate member, the free ends of the upper elongate members terminating in handle portions juxtaposed to define a complete handle, the lower ends of the lower elongate members spaced-apart and pivotally mounted to the load support beam proximate to the wheel assemblies, the upper and lower elongate members of each folding frame strut pivoting approximately in the same plane as the upper and lower elongate members of the other folding frame strut, so that when the folding frame struts are in a folded position:
   the upper and lower elongate members of each folding frame strut nest adjacent to each other,
   the nested elongate members of each folding frame strut nest adjacent to the nested elongate members of the other folding frame strut and
   both folding frame struts nest against the support beam with the handle portions overlaying the ends of the support beam; and
   (f) means for locking each folding frame strut in an unfolded position.

2. A collapsible luggage carrier as in claim 1, wherein, when the folding frame struts are unfolded, the lower elongate members are oriented perpendicular to the load support beam and parallel to each other.

3. A collapsible luggage carrier as in claim 1, wherein, when the folding frame struts are unfolded, each lower elongate member is colinear with the upper elongate member to which it is pivotaly attached.

4. A collapsible luggage carrier as in claim 1, 2 or 3, wherein the load support beam has a generally rectangular and planar vertical surface and a generally rectangular and planar horizontal surface, and
   (a) the folding spaced-apart load support forks are pivotally mounted to the horizontal surface, with the pivot points being staggered about the longitudinal centerline of the horizontal surface, so that the load support forks when folded nest against the horizontal surface parallel to the longitudinal centerline of the horizontal surface; and
   (b) the lower ends of the lower elongate members are spaced apart and pivotally mounted to the vertical surface, with the pivot points being staggered about the longitudinal centerline of the vertical surface so that the folding frame struts when folded nest against the vertical surface parallel to the longitudinal centerline of the vertical surface.

5. A collapsible luggage carrier as in claim 4, wherein the means for locking each support fork in an unfolded position comprises:
   (a) a first pin terminating in a flanged head located on the horizontal surface adapted to engage a slot in a first of the load support forks when the first load support fork is in an open position; and
   (b) a second pin terminating in a flanged head located on the horizontal surface adapted to engage a slot in the second load support fork when the second load support fork is in an open position.

6. A collapsible luggage carrier as in claim 4, wherein a first of the lower elongate members is pivotally mounted to the vertical surface proximate to its lower end, and the second lower elongate member is pivotally mounted to the vertical surface distally above its lower end, and the means for locking each folding frame strut is an unfolded position comprises:
   (a) a third pin terminating in a flanged head located on the vertical surface above the first lower elongate member's pivot point;
   (b) a slot in the first lower elongate member located above the first lower elongate member's pivot point and adapted to engage the third pin when the first lower elongate member is in an open position;

(c) a fourth pin terminating in a flanged head located on the vertical surface below the second lower elongate member's pivot point;

(d) a slot in the second lower elongate member located below the second lower elongate member's pivot point and adapted to engage the fourth pin when the second lower elongate member is in an open position.

7. A collapsible luggage carrier as in claim 4, wherein the means for locking each support fork in an unfolded position comprises:

(a) a first wing nut threaded onto a first threaded stud, the free end of the first threaded stud adapted to prevent removal of the wing nut threaded thereon;

(b) the first threaded stud located on the horizontal surface adapted to engage a slot in a first of the load support forks when the first load support fork is in an open position;

(c) a second wing nut threaded onto a second threaded stud, the free end of the second threaded stud adapted to prevent removal of the wing nut threaded thereon;

(d) the second threaded stud located on the horizontal surface adapted to engage a slot in the second load support fork when the second load support fork is in an open position;

whereby, upon opening the load support forks, the first and second wing nuts can be screwed tightly against the load support forks to tightly lock them in an open position.

8. A collapsible luggage carrier as in claim 4, wherein a first of the lower elongate members is pivotally mounted to the vertical surface proximate to its lower end, and the second lower elongate member is pivotally mounted to the vertical surface distally above its lower end, and the means for locking each folding frame strut in an unfolded position comprises:

(a) a third wing nut threaded onto a third threaded stud, the free end of the third threaded stud adapted to prevent removal of the wing nut threaded thereon;

(b) the third threaded stud located on the vertical surface above the first lower elongate member's pivot point;

(c) a slot in the first lower elongate member located above the first lower elongate member's pivot point and adapted to engage the third threaded stud when the first lower elongate member is in an open position;

(d) a fourth wing nut threaded onto a fourth threaded stud, the fourth threaded stud adapted to prevent removal of the wing nut threaded thereon;

(e) the fourth threaded stud located on the vertical surface below the second elongate member's pivot point;

(f) a slot in the second lower elongate member located below the second lower elongate member's pivot point and adapted to engage the fourth threaded stud when the second elongate member is in an open position;

whereby, upon opening the folding frame struts, the third and fourth wing nuts can be screwed tightly against the lower elongate members to tightly lock the folding frame struts in an open position.

9. A collapsible luggage carrier as in claim 6, wherein each lower elongate member is pivotally mounted, distally below its upper end, to its respective upper elongate member, proximate to the upper elongate member's lower end, and the means for locking the folding frame struts in an unfolded position further comprises:

(a) fifth and sixth pins terminating in flanged heads, each pin respectively mounted on a lower elongate member proximate to the upper end of the lower elongate member; and (b) a slot in each upper elongate member located distally above the lower end of the upper elongate member, each slot adapted to engage respectively the fifth and sixth pins when the folding frame struts are in an unfolded position.

10. A collapsible luggage carrier as in claim 7, wherein each lower elongate member is pivotally munted, distally below its upper end, to its respective upper elongate member, proximate to the upper elongate member's lower end, and the means for locking the folding frame struts in an unfolded position further comprises:

(a) fifth and sixth wing nuts threaded respectively onto fifth and sixth threaded studs, the free end of each stud adapted to prevent removal of the wing nut threaded thereon;

(b) each stud respectively mounted on a lower elongate member proximate to the upper end of the lower elongate member; and (c) a slot in each upper elongate member located distally above the lower end of the upper elongate member, each slot adapted to engage respectively the fifth and sixth threaded studs when the folding frame struts are in an unfolded position;

whereby, upon opening the folding frame struts, the fifth and sixth wing nuts can be screwed tightly against the upper elongate members to tightly lock the folding frame struts in an open position.

11. A collapsible luggage carrier as in claim 4, wherein the free ends of the load support forks are bent downward to define feet that in cooperation with the wheel assemblies allow the luggage carrier to stand upright.

* * * * *